United States Patent
Rodopoulos et al.

(10) Patent No.: US 9,580,772 B2
(45) Date of Patent: Feb. 28, 2017

(54) ELECTRORECOVERY OF METALS

(75) Inventors: Theo Rodopoulos, Blackburn South (AU); Michael David Horne, Blackburn (AU); Thomas Ruether, Ormond (AU)

(73) Assignee: Commonwealth Scientific and Industrial Research Organisation (AU)

( * ) Notice: Subject to any disclaimer, the term of this patent is extended or adjusted under 35 U.S.C. 154(b) by 94 days.

(21) Appl. No.: 13/257,022

(22) PCT Filed: Mar. 17, 2010

(86) PCT No.: PCT/AU2010/000312
§ 371 (c)(1),
(2), (4) Date: Sep. 16, 2011

(87) PCT Pub. No.: WO2010/105299
PCT Pub. Date: Sep. 23, 2010

(65) Prior Publication Data
US 2012/0000790 A1    Jan. 5, 2012

(30) Foreign Application Priority Data

Mar. 17, 2009   (AU) ............................... 2009901105

(51) Int. Cl.
*C22B 21/00* (2006.01)
*C25C 3/06* (2006.01)
(Continued)

(52) U.S. Cl.
CPC ...... *C22B 21/0015* (2013.01); *C22B 21/0046* (2013.01); *C25C 3/00* (2013.01);
(Continued)

(58) Field of Classification Search
CPC .... C25C 1/02; C25C 3/00; C25C 3/06; C25C 3/18; C22B 21/0015; C22B 21/0046; Y02P 10/234
(Continued)

(56) References Cited

U.S. PATENT DOCUMENTS

| | | | |
|---|---|---|---|
| 2005/0039790 A1* | 2/2005 | Chittibabu et al. | 136/252 |
| 2010/0252446 A1* | 10/2010 | Kuzmanovic et al. | 205/684 |
| 2011/0000782 A1* | 1/2011 | Reddy et al. | 204/158.2 |

FOREIGN PATENT DOCUMENTS

| | | |
|---|---|---|
| WO | WO 99/41752 A1 | 8/1999 |
| WO | WO 02/066712 A1 | 8/2002 |

(Continued)

OTHER PUBLICATIONS

Yoshizawa-Fujita, M. et al. "A new Lewis-base ionic liquid comprising a mono-charged diamine structure: A highly stable electrolyte for lithium electrochemistry", Electrochemistry Communications, vol. 8, 2006, pp. 445-449.
(Continued)

*Primary Examiner* — Ciel Thomas
(74) *Attorney, Agent, or Firm* — Merchant & Gould P.C.

(57) ABSTRACT

A method and ionic liquid for the electrorecovery of metal from a metal salt including at least one metal ion. The method includes the steps of dissolving the metal salt in an ionic liquid, the ionic liquid including an ionic liquid cation and an ionic liquid anion; whereby the metal ion of the metal salt forms a metal complex in solution with at least the ionic liquid cation; and subjecting the metal complex to an electrical potential between a cathode and anode to recover metal at the cathode. The ionic liquid includes an ionic liquid cation and an ionic liquid anion, wherein the ionic liquid cation has an affinity for the metal ion which is at least about equal to that of the ionic liquid anion for the metal ion.

25 Claims, 2 Drawing Sheets

(51) Int. Cl.
*C25C 3/00* (2006.01)
*C25C 3/18* (2006.01)

(52) U.S. Cl.
CPC .................. *C25C 3/06* (2013.01); *C25C 3/18* (2013.01); *Y02P 10/234* (2015.11)

(58) Field of Classification Search
USPC .................................. 205/367–409, 560–614
See application file for complete search history.

(56) References Cited

FOREIGN PATENT DOCUMENTS

WO   WO 2006/072785        7/2006
WO   WO 2009/016189 A1    2/2009

OTHER PUBLICATIONS

Kerr, K. "Properties of DABCO Containing Ionic Liquids", Abstracts—ACS Mid-Atlantic Regional Meeting, MARM, May 19, 2008, MRM-286.

Lall-Ramnarine, S. "Comparing the thermal and microwave assisted syntheses of DABCO ionic liquids", Abstracts—ACS Mid-Atlantic Regional Meeting, MARM, May 17, 2007, MRM-396.

Gutmann, V. "Solvent Effects on the Reactivities of Organometallic Compounds", Coordination Chemistry Reviews, vol. 18, 1976, pp. 225-255.

Wykes, A. et al. "Synthesis of New Lewis Basic Room-Temperature Ionic Liquids by Monoquaternization of 1,4-Diazabicyclo[2.2.2]octane (DABCO)", SYNLETT, vo. 1, 2007, pp. 107-110.

Yoshizawa-Fujita, M. et al. "Novel Lewis-base ionic liquids replacing typical anions", Tetrahedron Letters, vo. 47, 2006, pp. 2755-2758.

Lai, et al., "Electrodeposition of aluminium in aluminium chloride/ 1-methyl-3-imidazolium chloride.", J. Electroanal. Chem, 248, p. 431-440, (1988).

Zhang, et al., "New electrolytes for aluminum production: Ionic liquids.", Journal of Mining and Metallurgy, 55 ,11, p. 54-57, (2003).

Freire, et al., "Hydrolysis of Tetrafluoroborate and Hexafluorophosphate Counter Ions in Imidazolium-Based Ionic Liquids.", J. Phys. Chem. A,114,11, p. 3744-3749, (2010).

Seddon, et al., "Influence of chloride, water, and organic solvents on the physical properties of ionic liquids.", Pure Appl. Chem., vol. 72, No. 12, p. 2275-2287, (2000).

Kamavaram, et al., "Electrorefining of Aluminum Alloy in Ionic Liquids at Low Temperatures.", Journal of Mining and Metallurgy, 39 ,1-2, B, p. 43-58, (2003).

N/A, "Aluminium Chloride.", Wikipedia: The Free Encyclopedia. Wikimedia Z.foundation, Inc., retrieved at: <http://en.wikipedia.org/ wiki/Aluminium_chloride>, May 13, 2015.

MacFarlane et al. "Lewis bas ionic liquids." *Chem. Commun. Royal Sco. of Chem.* (2006) pp. 1905-1917.

European Search Report for EP application No. 10 75 3000 mailed Apr. 20, 2015 (6 pages).

\* cited by examiner

ELECTRORECOVERY OF METALS

This application is a National Stage Application of PCT/AU2010/000312, filed 17 Mar. 2010, which claims benefit of Serial No. 2009901105, filed 17 Mar. 2009 in Australia and which applications are incorporated herein by reference. To the extent appropriate, a claim of priority is made to each of the above disclosed applications.

FIELD OF THE INVENTION

This invention relates to the electrochemical recovery of metals from metal complexes and in particular, electrorecovery through the use of ionic liquids.

BACKGROUND OF THE INVENTION

Electrochemical recovery of metals from ionic liquids, that is, the recovery of metals from a solution by applying a sufficiently negative electric potential to the solution causing electrochemical reduction of a metal complex, and electrodeposition of a metal or metals at the cathode is a commonly used process. The metal complex may be formed, for instance, from the dissolution or leaching of an ore. As another example, the metal complex may be formed by the dissolution or corrosion of bulk metal from, or impurities within, a metallic object. The corrosion may also be actively accelerated by, for example, making the metal object the positive electrode (anode) in an electrochemical cell and oxidising its metal constituents electrochemically. The electrochemical reduction process, wherein the metal ions in the metal complex are reduced at the cathode from their charged states and deposited on the cathode in their zero valence states, may be called, for instance, electrolysis, electrowinning, electroplating, electrodeposition and electrorefining. In this specification, the process will be conveniently referred to as electrorecovery.

Ionic liquids are molten salts which typically melt below 100° C. The properties of these liquids vary widely, but some are very stable to oxidation and reduction and also have high conductivity. Ionic liquids with these properties are useful as solvents and electrolytes for numerous electrochemical applications including metal electrodeposition. Metal complexes in ionic liquid solution are almost always negatively charged (anionic) which inhibits their electrochemical reduction because coulombic forces repel them from negatively charged electrodes (cathodes) as reducing potentials are applied.

The electrochemical reduction of metal complexes in solution to form metals requires the metal complex to approach the negative electrode (cathode) closely. The electrical potential that must be applied to a cathode for reduction to occur varies depending on the identity of the metal complex but in most cases the electrode develops a negative surface charge when the potential is applied; that is, when the electrode is polarized. As a consequence of this surface charge, Coulombic forces affect the populations of ions near the surface of a polarized electrode.

In the vast majority of cases, cations such as metal ions dissolved in ionic liquids co-ordinate with the anion of the ionic liquid, for instance the bis(trifluoromethylsulfonyl) amide, abbreviated $NTf_2^-$, to produce negatively-charged complexes in solution. This is particularly true for metal complexes formed by dissolving metal salts in ionic liquids where the metal ion is attracted to, and often binds with, the negative ion (anion) of the ionic liquid. By contrast, metal salts in aqueous solution form positively charged metal aquo complexes.

When the metal complex is electrochemically reduced, during for example, electrodeposition, the complex diffuses towards the electrode where reduction takes place (the cathode) which itself is often negatively charged. The Coulombic force between the metal complex—which has a net negative charge—and the negatively-charged cathode, is repulsive. Moreover, as the metal complex approaches the cathode, the Coulombic force increases. However, the complex needs to approach the cathode to within a few nanometers (nm) before it will be electrochemically reduced at any appreciable rate. Thus, Coulombic forces repel almost all metal complexes in ionic liquids from a negatively charged electrode making their electrochemical reduction difficult and inefficient.

To overcome this repulsive force so that electrochemical reduction of the metal complex will occur at an appreciable rate, it is necessary to significantly increase the concentration of the metal complex and/or impart vigorous relative motion between the cathode and the solution by, for example, stirring. Neither step is commercially attractive.

Thus, there is a need to provide an electrolyte solution that removes, or at least reduces, the above described issues.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

It has been identified that the chemistry of the cation of an ionic liquid may be advantageously modified so that it is capable of co-ordinating with other species', for instance a metal ion, in solution through appropriate functionalities defined as donor centres (D). D is typically an electron donor or a Lewis basic site. This co-ordination may be in place of, or in addition to, the typical co-ordination of the anion ($A^-$) of the ionic liquid with the same other species. If the cation ($C^+$) of the ionic liquid co-ordinates with the dissolved metal ion, added as a metal salt (e.g. $AlCl_3$), then the metal complex that is formed will be less negatively-charged than if co-ordination had occurred by the anion of the ionic liquid alone.

In Scheme 1, an ionic liquid is represented by ($C^+$)($A^-$) and various scenarios are described for how the ionic liquid of the present invention can co-ordinate, or interact, with the other species (in this case $AlCl_3$). Co-ordination by the cation of the ionic liquid to the metal ion may even form a neutral or positively-charged metal complex. This change is particularly desirable if the metal complex is to be electrochemically reduced at a cathode which itself is negatively charged. That is, lowering the size of the negative charge, or forming a positive charge, on the metal complex assists the approach of the complex to the negatively-charged cathode during reduction and thereby accelerates the rate of reduction of the metal complex. Scheme 1 below shows that either the cation or anion can behave as ligands either through substitution or addition. The reactions which show the anion ($A^-$) interacting with the $AlCl_3$ are not implying this is brought about by the cation (C).

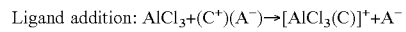

Ligand addition: $AlCl_3 + (C^+)(A^-) \rightarrow [AlCl_3(C)]^+ + A^-$

AlCl$_3$+(C$^+$)(A$^-$)→[AlCl$_3$(A)]$^-$+C$^+$ and

AlCl$_a$+(C+)(A-)→[AlCl$_3$(C)(A)]

Ligand substitution: AlCl$_3$+(C$^+$)(A$^-$)→[AlCl$_2$(C)]$^{2+}$+ Cl$^-$+A$^-$ and AlCl$_3$+(C$^+$)(A$^-$)→[AlCl$_2$(A)]+Cl$^-$+C$^+$ AlCl$_3$+(C$^+$)(A$^-$)→[AlCl(C)(A)]$^{2+}$+2Cl$^-$ where (C$^+$)(A$^-$) is an ionic liquid and C$^+$ contains a donor centre (D)

Scheme 1

Accordingly, in a first aspect of the invention there is provided a method for the electrorecovery of metal from a metal salt including at least one metal ion, the method including the steps of
- dissolving the metal salt in an ionic liquid, the ionic liquid including an ionic liquid cation and an ionic liquid anion; whereby the metal ion of the metal salt forms a metal complex in solution with at least the ionic liquid cation; and
- subjecting the metal complex to an electrical potential between a cathode and anode to recover metal at the cathode.

In a further preferred form of the invention, the metal ion forms a metal complex in solution with only the ionic liquid cation.

In a preferred form of the invention, the metal ion forms a metal complex in solution with both the ionic liquid cation and the ionic liquid anion.

In a further preferred form of the invention, the metal ion forms a positively-charged metal complex.

In a further aspect of the invention there is provided an ionic liquid for electrorecovery of metal from a metal salt including at least one metal ion, the ionic liquid including
- an ionic liquid cation and an ionic liquid anion,
wherein the ionic liquid cation has an affinity for the metal ion which is at least about equal to that of the ionic liquid anion for the metal ion.

The ionic liquid cation therefore competes effectively with the ionic liquid anion, and any other potential ligands in solution, for the available coordination sites on the metal ions in solution. By 'competes effectively' it is meant that actual interaction between the ionic liquid cation and the metal ions takes place. The ability of the ionic liquid cation to form a complex is tailored such as to allow for sufficient bond formation with the metal ions in the dissolution process and for ease of the bond breaking in the deposition step. That is, the complex formation constant between the metal ion and the ligand (in this case, the ionic liquid cation) is neither too high nor too low to enable this process. The ionic liquid anion may or may not interact with the metal ions.

The electrorecovery process may be, for instance, electrolysis, electrodeposition, electrowinning, electroplating or electrorefining.

The ionic liquid cation may be of an alicyclic or cyclic nature, where multiple carbon chains are linked to heteroatoms in such a way as to create a positive charge. That is, the ionic liquid cation has a positive charge. The carbon chains are of a length that creates a stable system which is liquid within the anticipated temperature range of operation. The heteroatoms may be elements of group VA and VIA of the periodic table of the elements. The arrangement would be apparent to those skilled in the art. The carbon chains may be of a saturated or unsaturated (alkenes, alkynes) nature. The carbon chain may be a linear or a branched array of carbon atoms. In addition, the cyclic compounds may also be of an unsaturated or aromatic nature, including condensed ring systems. Furthermore, the cyclic compounds may be of multiple ring cycles and spirocyclic structures. Therefore, the ionic liquid cation may be chosen from the compound classes: ammoniums, antimoniums, arsoniums, imidazoliums, morpholiniums, oxazoliums, oxoniums, phosphoniums, pyridiniums, pyrrolidiniums, piperidiniums, piperaziniums, pyraziniums, seleniums, sulfoniums, teluriums, thiazoliums, triazolium and the like. See Scheme 2 for examples.

Scheme 2

Examples of alicyclic systems

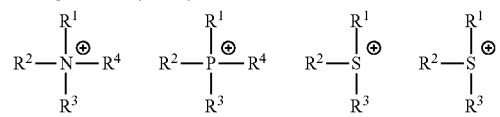

Examples of saturated heterocycles

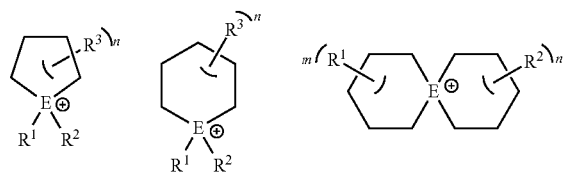

E = N, group VA

Examples of heterocyclic systems with an aditional donor centre contained in the ring system

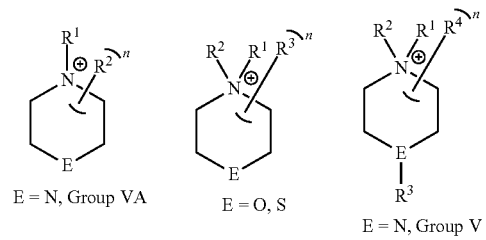

E = N, Group VA    E = O, S    E = N, Group V

Examples of linear and branched saturated Rgroups

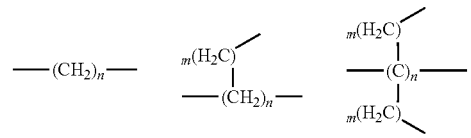

Examples of unsaturated heterocyclic ring systems

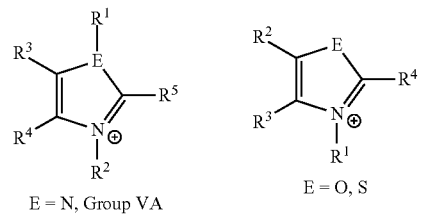

E = N, Group VA    E = O, S

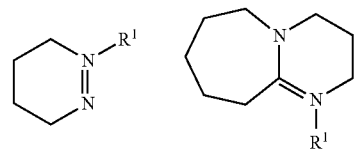

-continued
Examples of linear and branched unsaturated R groups

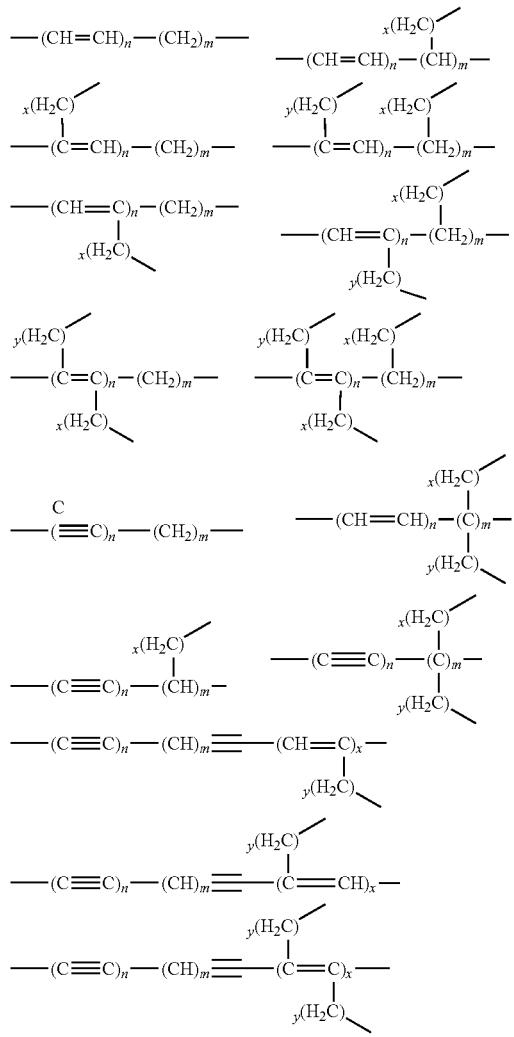

m, n, x, y, z = 0-20

Examples of aromatic ring systems

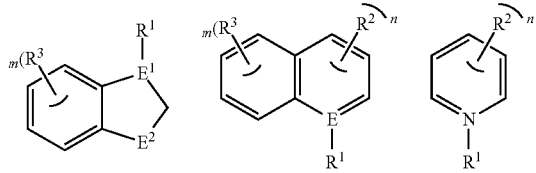

Examples of donor centres incorporated in IL cations

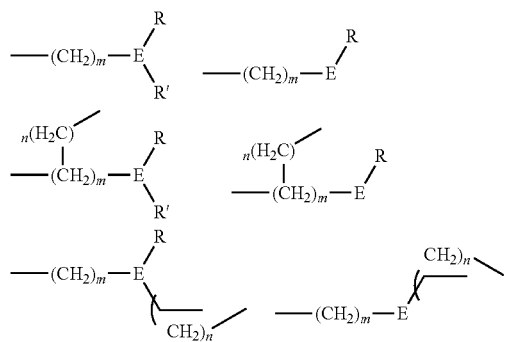

-continued

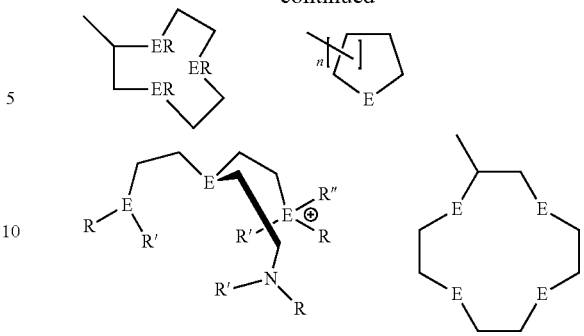

The cation of the ionic liquid contains an additional functional group (additional to the heteroatom that creates a positive charge) that is capable of interacting with metal ions present in the ionic liquid electrolyte. That is, as well as the positive charge, the ionic liquid cation also has, for instance, a partial or formal negative charge. This additional functionality, which is referred to herein as a donor centre (D), is also known by those skilled in the art as a Lewis base or Lewis basic site. A Lewis base is a molecular entity with a lone pair of electrons that can be donated to coordinate to a Lewis acid, such as a transition metal ion. When a Lewis acid and Lewis base form a complex ion (Lewis adduct), the Lewis base is always the ligand. A nucleophile is considered a Lewis base. Typical examples are:

compounds of N, P, As, Sb and Bi in oxidation state 3; and
compounds of O, S, Se and Te in oxidation state 2, including water, ethers, ketones, sulphoxides.

In chemistry, the donor number is a quantitative measure of Lewis basicity and was devised by Gutmann (1976). This is often referred to as the Gutmann donor number. See, for example, GUTMANN, V. (1976), *Coord. Chem. Rev.*, 18, 225-255. A donor number is defined as the negative enthalpy value for the 1:1 Lewis adduct formation between a Lewis base and the standard Lewis acid $SbCl_5$ (antimony pentachloride), in dilute solution in the non-coordinating solvent 1,2-dichloroethane with a zero donor number. The units are kilocalories per mole. The donor number is a measure of the ability of a solvent to solvate cations and Lewis acids.

Thus, D typically has free electron pairs for co-ordination to a metal centre (ie D is an electron-pair donor) and is therefore typically selected from group VA-VIIA elements of the periodic table. However, carbenes may also be suitable for use as D. D may be part of typical functional groups prominent in organic compounds such as, but not limited to, ethers, ketones, aldehydes, carboxylates, alcohols, amines (primary, secondary, tertiary), imines, hydrazines, carbamates, organo phosphines with phosphorus in the formal oxidation state 3, organo phosphine oxides with phosphorus in the formal oxidation state V. The skilled person would be able to select suitable constituents for D.

The donor centres (D) may be located in the ring system and/or in side-chains connected to the ring system, of the ionic liquid cations, for instance as shown in Scheme 2. In the acyclic systems, D are located at any position in one or more of the carbon chains.

In preferred embodiments, the ionic liquid cation is preferably 1-alkyl-1,4-diazabicyclo[2.2.2]octane ($C_n$DABCO) where the alkyl group ($C_n$) is preferably, but not limited to, a $C_1$ to $C_{14}$ moiety and may be saturated, unsaturated, branched or contain other functionalities.

The ionic liquid anion may be any anion which can be used in the synthesis of ionic liquids and includes those known in the art to be suitable for use in the electrorecovery of metals (see Scheme 3 for examples). As a preferred example, the ionic liquid anion may be bis(trifluoromethylsulfonyl)amide.

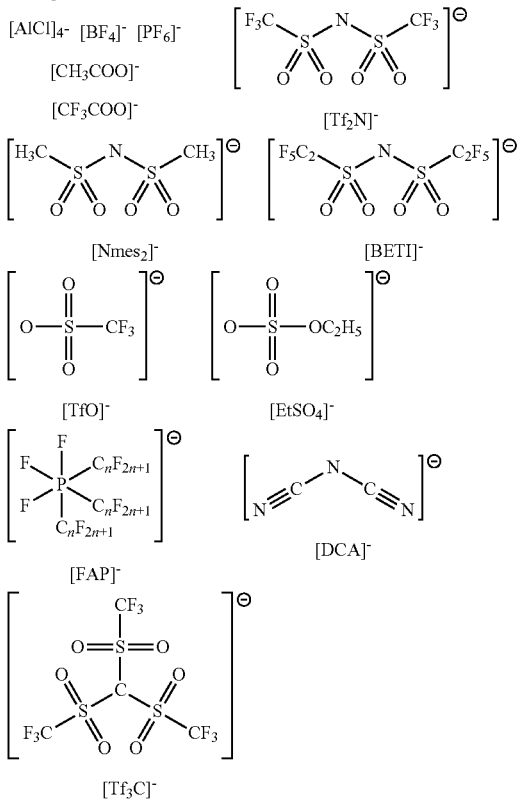

Scheme 3

The metal ion to be recovered includes all elements defined as metals or metalloids in the periodic table of the elements. For example, this includes transition metals such as, but not restricted to, vanadium, chromium, manganese, iron, cobalt, nickel, copper, zinc, molybdenum, ruthenium, rhodium, palladium, silver, cadmium, tungsten, osmium, iridium, platinum, gold, and mercury, Group IIIA-VIA metals such as, but not restricted to, aluminium, lead, tin and gallium, alkali metals, alkali earth metals, and rare-earth metals and metalloids such as, but not restricted to, silicon, germanium, arsenic and antimony.

In another aspect of the invention there is provided an ionic liquid for electrorecovery of metal from a metal salt including at least one metal ion, the ionic liquid including
an ionic liquid anion, and
an ionic liquid cation containing at least one donor centre (D), the Lewis basicity of the donor centre of the ionic liquid cation being such that the ionic liquid cation is capable of forming a metal complex with the metal ion.

Preferably the ionic liquid cation combines with the metal ion to provide a metal complex which is at least neutral but preferably positively charged. The donor centre (D) which typically has a lone pair of electrons for co-ordination to the metal ion is preferably provided to the ionic liquid cation by a donor atom selected from group VA-VIIA elements of the periodic table, more preferably O, N, S or P. Most preferably, and in particular when the metal ion is an aluminium ion, the donor centre (D), or Lewis basic site, is a nitrogen containing group. In these embodiments, the ionic liquid cation is preferably 1-alkyl-1,4-diazabicyclo[2.2.2]octane ($C_n$DABCO) and the alkyl group ($C_n$) is preferably, but not limited to, a $C_1$ to $C_{14}$ moiety and may be saturated, unsaturated, branched or contain other functionalities. In other embodiments, for instance where the affinity of the ionic liquid anion for the metal ion to be recovered is greater than the ionic liquid cation for the metal ion to be recovered, the donor centre (D) in the ionic liquid cation may more suitably contain a more electronegative element, such as O. That is, the strength of D can be tailored to suit the application.

The ionic liquid cation may include a number of donor centres (D) as necessary to achieve the desired result. For instance, the number of D may be increased in order to increase the affinity of the ionic liquid cation for the metal ion to be recovered. The number, and strength, of D should be such that the ionic liquid cation interacts with the metal ion to be recovered in preference to at least one of the ionic liquid anions which would normally co-ordinate to the metal ion. The co-ordination of the metal ion by the ionic liquid cation produces a complex which has a less negative, neutral, or positive charge, thereby increasing the rate of reduction of the metal complex during electrorecovery by decreasing the Coulombic resistance to movement of the metal complex towards the negatively charged cathode.

In another aspect of the invention there is provided a method for forming a metal complex including a metal ion, the complex being suitable for the electrorecovery of metal from the complex, the method including the step of
providing an ionic liquid including an ionic liquid anion and an ionic liquid cation containing at least one donor centre (D); and
combining the ionic liquid with the metal ion;
wherein the Lewis basicity of the donor centre (D) of the ionic liquid cation is such that the ionic liquid cation forms a metal complex with the metal ion.

In those metal complexes which contain both ionic liquid cations and any other anion, including ionic liquid anions, the number of ionic liquid cations is sufficient to affect the electrorecovery process. Additionally, the concentration of metal complexes which contain both ionic liquid anions (or other anions) and ionic liquid cations is also sufficient to affect the electrorecovery process.

In another aspect of the invention there is provided a method for improving the efficacy of electrorecovery of a metal from a metal salt including at least one metal ion, the method including the steps of
providing an ionic liquid including an ionic liquid anion and an ionic liquid cation containing at least one donor centre (D);
combining the ionic liquid with the metal ion; wherein the Lewis basicity of the donor centre (D) in the ionic liquid cation is such that the ionic liquid cation forms a metal complex with the metal ion; and
subjecting the metal complex to an electrical potential between an anode and a cathode to recover the metal at the cathode.

Preferably the metal complex includes only the ionic liquid cation, and not also the ionic liquid anion, in order to yield a metal complex with a more positive charge. The efficacy of the electrorecovery process may be affected in that the threshold concentration of the metal ions in the ionic liquid is significantly reduced. The reduction is preferably of the order of a factor of 2. That is, half, or less than half, of the concentration of metal ions in the ionic liquid is required for electrodeposition to occur or to achieve the same current density as known ionic liquids.

Alternatively, the current density of the metal ions to the cathode for a known concentration of metal ions in solution is increased relative to that of known ionic liquids. The increase is preferably on the order of 3 to 5 times that of the prior art process.

DETAILED DESCRIPTION OF THE EMBODIMENTS

Figure 1:
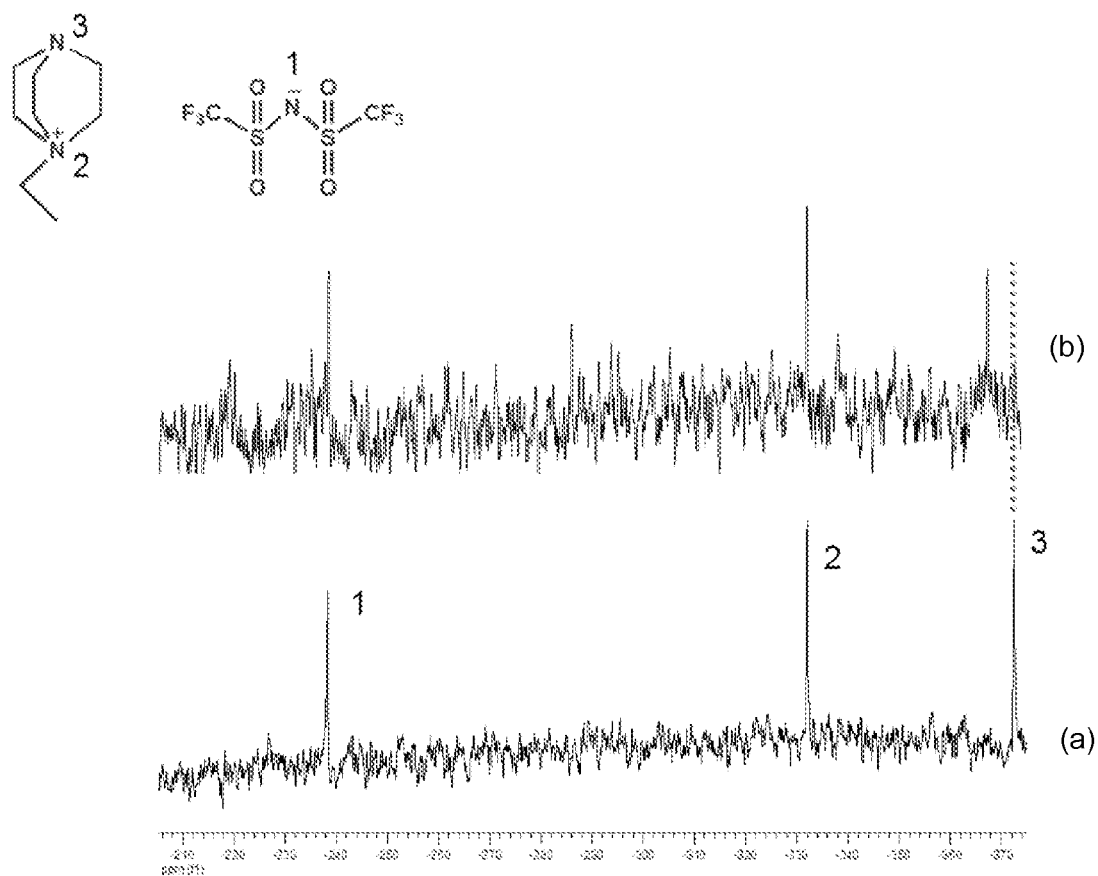
FIG. 1—$^{15}$N NMR spectra of (a) pure [$C_2$DABCO][$NTf_2$] and (b) [$C_2$DABCO][$NTf_2$] containing 0.5 molal $AlCl_3$ acquired at 110° C. Assignments for the nitrogen signals are shown on the structure.

In the vast majority of cases, metal ions dissolved in ionic liquids co-ordinate with the anions of the ionic liquid and produce negatively-charged complexes in solution. In the present invention, the chemistry of the cation of the ionic liquid is modified so that it co-ordinates, as a ligand, with the metal ion in solution. The co-ordination of any neutral or positively charged ligands with the metal ion produces metal complexes which are less negatively-charged, or even positively charged, in solution. This change is particularly desirable if the metal complex is electrochemically reduced at an electrode. Lowering the net negative charge, or forming a positive charge, on the complex assists the approach of the complex to the negatively-charged cathode during reduction and thereby accelerates the rate of reduction of the metal.

The affinity of the ionic liquid cation for the metal ion to be recovered is adjusted so that the ionic liquid cation binds with the metal ion to be recovered in the electrolyte. More specifically, the ionic liquid cation must be able to successfully compete with other potential ligands in the ionic liquid electrolyte, including the ionic liquid anion (and any anions introduced with the metal salt that is added to the ionic liquid, eg $Cl^-$ in $AlCl_3$). Successful competition means that actual interaction of the ionic liquid cation with the metal ion takes place to some degree.

However, the ionic liquid cation must not bind so strongly with the metal ion to be recovered that the complex formed is too stable to be electrochemically reduced within the electrochemical window of the ionic liquid. That is, in order to avoid reduction of the ionic liquid itself, the metal complex formed by the ionic liquid cation and the metal ion to be recovered must be reducible within the electrochemical window of the ionic liquid. The complex formation ability of the ionic liquid cation is tailored in a way to allow for sufficient bond formation with the metal ions in the dissolution process and for ease of the bond breaking in the deposition step. That is, the complex formation constant between the metal ion and the ligand (in this case, the ionic liquid cation) is neither too high nor too low to enable this process. Interaction of a ligand with a metal ion to be recovered can be measured using techniques such as mass spectroscopy and NMR.

The donor centre of the cation must be carefully chosen from functional groups or atoms that have an affinity for the metal ion to be recovered at the cathode by an electrorecovery process. A donor centre with a high affinity for the metal ion in solution will form a metal complex that is too stable and will not be reducible within the electrochemical window of the ionic liquid.

Further, the ionic liquid must be fluid enough at the operating temperature to allow the transport of the complexed metal ions during the electrorecovery process.

The cationic entity of the ionic liquid may be, for instance, as in Scheme 2. may be of an alicyclic or cyclic nature where multiple carbon chains are linked to heteroatoms in a way creating a positive charge for the entity. The carbon chains are of a length that creates a stable system which is liquid in the anticipated temperature range of operation. The heteroatoms may be elements of group VA and VIA of the periodic table of the elements—the arrangement is obvious for those skilled in the art. The carbon chains may be of a saturated or unsaturated (alkenes, alkynes) nature. The carbon chain may be a linear or a branched array of carbon atoms. In addition, the cyclic compounds may also be of an unsaturated or aromatic nature, including condensed ring systems. Furthermore, the cyclic compounds may be of multiple ring cycles and spirocyclic structures. Therefore, the cationic entity of the ionic liquid may be chosen from the compound classes: ammoniums, antimoniums, arsoniums, imidazoliums, morpholiniums, oxazoliums, oxoniums, phosphoniums, pyridiniums, pyrrolidiniums, piperidiniums, piperaziniums, pyraziniums, seleniums, sulfoniums, teluriums, thiazoliums, triazolium and the like.

The ionic liquid anion may be any known to those skilled in the art (Scheme 3). For instance, the anion could be bis(trifluoromethylsulfonyl)amide($NTf_2^-$).

The current density is a measure of the number of electroreducible metal complexes reaching the cathode per unit area. In the case of an electrorecovery process, the current density is a reflection of the rate of the electrorecovery. As mentioned, the movement of the metal ions to be recovered towards the cathode will be affected by the charge on those complexed metal ions (ie the metal ion as part of a complex with components of the ionic liquid and other ligands present in the system). In a prior art ionic liquid electrorecovery process, the charge on the metal complex is negative, thus hindering movement of the metal complexes towards the negative cathode and thus reducing the current density. In the present invention, the charge on the metal complex is less negative, neutral, or positive, than in the prior art, thus increasing the ease with which the cations may move toward the negative cathode and thus increasing the current density. For the present invention, current densities on the order of 3 to 5 times higher than those achievable for the prior art ionic liquids are achievable.

In the prior art ionic liquid systems, the aluminium ion concentration in the ionic liquid electrolyte must be relatively high in order to allow electrorecovery. Increasing the concentration of negatively-charged metal complexes in solution can overcome the coulombic repulsion issues by placing the metal complexes in sufficient close proximity to the negatively-charged cathode to enable electrorecovery to take place. In the present invention, the concentration of the aluminium ions can be lower than that of the prior art. Typically, for ionic liquids including the ionic liquid cation of the present invention, the aluminium ion concentration may be about half that needed to conduct electrorecovery using a prior art ionic liquid.

The efficacy of the electrorecovery process may be affected in that the minimum concentration of metal ions required in the ionic liquid for electrorecovery to occur is lowered, preferably by a factor of 2. Alternatively, for a fixed concentration of metal ions in solution the rate of electrorecovery is 2 to 3 times faster compared to that in known ionic liquid solutions.

The cathode may be of any electrically conducting material suitable for use in electrorecovery. Thus it may be smooth, reticulated, or porous. It may also have a geometry that facilitates mass transport and minimises electrical impediments in the cell in which it is used. Thus it may be planar or cylindrical or another geometry which meets these criteria.

EXAMPLES

Example 1

NMR Evidence of Ionic Liquid Cation Interaction with a Metal Ion

In ionic liquids where the ionic liquid cation possesses a nitrogen donor centre such as in [$C_n$DABCO][$NTf_2$], $^{15}$N NMR spectroscopy may be used to obtain evidence for ionic liquid cation ($C_n$DABCO$^+$) coordination to metal ions in solution e.g. $Al^{3+}$.

In FIG. 1, the $^{15}$N NMR spectra of the pure ionic liquid [$C_2$DABCO][$NTf_2$] and that of a sample of [$C_2$DABCO][$NTf_2$] containing 0.5 molal $AlCl_3$ acquired at 110° C. are shown. All three nitrogen atoms of [$C_2$DABCO][$NTf_2$], two in the ionic liquid $C_2$DABCO$^+$ cation and one in the ionic liquid $NTf_2^-$ anion, were detected. The resonance at −238 ppm was assigned to the amide nitrogen in the ionic liquid $NTf_2^-$ anion, the resonance at −332 ppm was assigned to the quaternary amine nitrogen in the ionic liquid $C_2$DABCO$^+$ cation and the resonance at −372 ppm was assigned to the tertiary amine nitrogen (ie. the donor centre or Lewis basic site) in the ionic liquid $C_2$DABCO$^+$ cation. After the addition of 0.5 molal $AlCl_3$ to [$C_2$DABCO][$NTf_2$] the resonances at −238 and −332 remained unchanged but the resonance assigned to the tertiary nitrogen shifted by 5 ppm to −367 ppm. This shift in this resonance is likely due to the interaction of the tertiary nitrogen atom with $Al^{3+}$ resulting in the formation of an aluminium complex with a more positive charge.

Example 2

Figure 2:
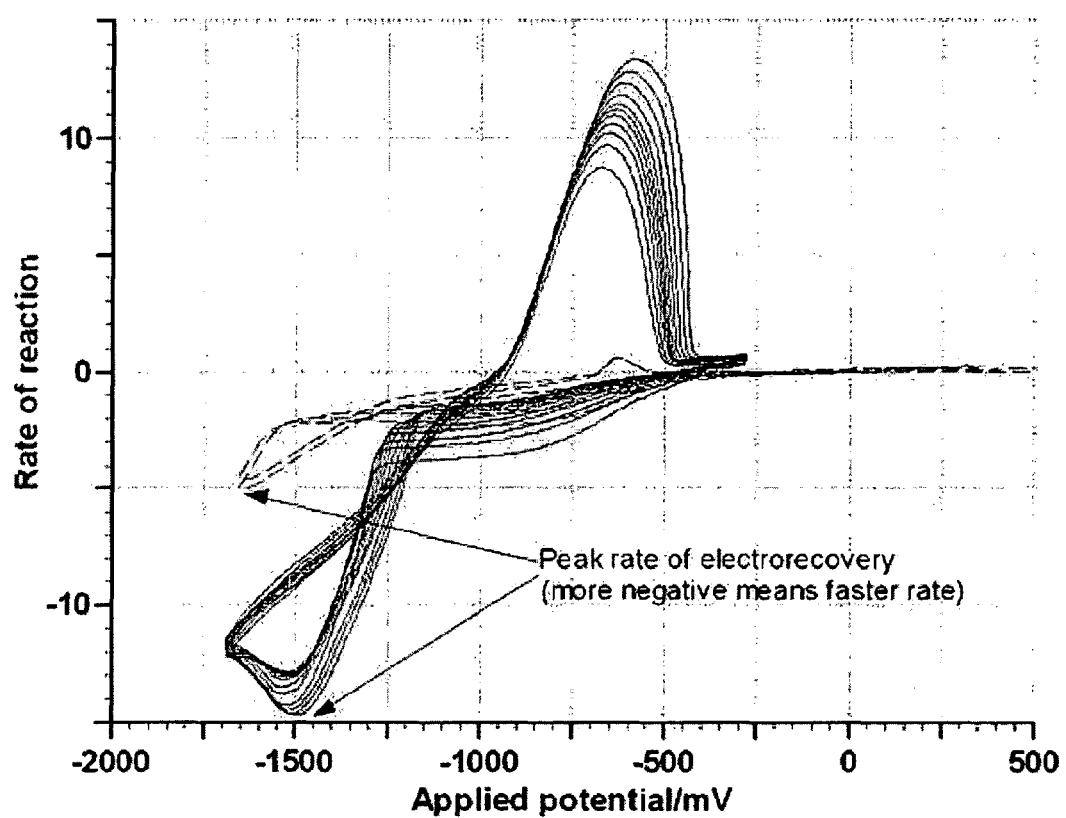
FIG. 2—Relative rates of electrorecovery of aluminium from known ionic liquid solution [$C_4$mpyr][$NTf_2$] (dotted line) and from [$C_2$DABCO][$NTf_2$] in accordance with the present invention (solid line).

Electrochemical Properties of an Ionic Liquid Cation of the Present Invention A 1.0 molal solution (1 mole of solute per kg of solvent) of anhydrous $AlCl_3$ in [$C_2$DABCO][$NTf_2$] is prepared by slowly adding small quantities of the $AlCl_3$ to molten [$C_2$DABCO][$NTf_2$] (whose melting point is approximately 70° C.) under an inert atmosphere. The solution is constantly stirred throughout. Aluminium can be electrorecovered from this solution at modest temperatures (80° C.-130° C.) using any of several standard electrochemical methods such as cyclic voltammetry (see FIG. 2), chronoamperometry, chronopotentiometry, etc. For example, aluminium may be electrorecovered from this solution at 110° C. during cyclic voltammetry on an abraded gold electrode. A peak current density of 150 A m$^{-2}$ occurs at about −1.5 volts (versus the ferrocene/ferrocenium redox couple).

A 0.75 molal solution (0.75 moles of solute per kg of solvent) of anhydrous $CuCl_2$ in [$C_2$DABCO][$NTf_2$] is prepared by slowly adding small quantities of the $CuCl_2$ to molten [$C_2$DABCO][$NTf_2$] under an inert atmosphere. The solution is constantly stirred throughout. Copper can be electrorecovered from this solution at modest temperature (80° C.-100° C.) using any of several standard electrochemical methods such as cyclic voltammetry, chronoamperometry, chronopotentiometry, etc. For example, copper may be electrorecovered from this solution at 80° C. during cyclic voltammetry on an abraded gold electrode. A peak current density of 50 A m$^{-2}$ occurs at about −1.4 volts (versus the silver/silver$^+$ redox couple).

A 1.5 molal solution (1.5 moles of solute per kg of solvent) of anhydrous $AlCl_3$ in N-ethyl-N,N-dimethyl-2-methoxyethylammonium bis(trifluoromethylsulfonyl)amide ([$N_{2,1,1}$OMe][$NTf_2$]) is prepared by slowly adding small quantities of the $AlCl_3$ to [$N_{2,1,1}$OMe][$NTf_2$] (which is a liquid at room temperature) under an inert atmosphere. The solution is constantly stirred throughout. Aluminium can be electrorecovered from this solution at modest temperature (80° C.-130° C.) using any of several standard electrochemical methods such as cyclic voltammetry, chronoamperometry, chronopotentiometry, etc. For example, aluminium may be electrorecovered from this solution at 80° C. during cyclic voltammetry on an abraded gold electrode. A peak current density of 100 A m$^{-2}$ occurs at about −2.0 volts (versus the silver/silver$^+$ redox couple).

A 1.5 molal solution (1.5 moles of solute per kg of solvent) of anhydrous $AlCl_3$ in 1-ethyl-1-methyl-4-methyl-piperazinium bis(trifluoromethylsulfonyl)imide [$C_2$,$C_1$mpipz][$NTf_2$] is prepared by slowly adding small quantities of the $AlCl_3$ to molten [$C_2$,$C_1$mpipz][$NTf_2$] under an inert atmosphere. The solution is constantly stirred throughout. Aluminium can be electrorecovered from this solution at modest temperature (80° C.-110° C.) using any of several standard electrochemical methods such as cyclic voltammetry, chronoamperometry, chronopotentiometry, etc. For example, aluminium may be electrorecovered from this solution at 80° C. during cyclic voltammetry on an abraded gold electrode. A peak current density of 110 A m$^{-2}$ occurs at about −1.6 volts (versus the ferrocene/ferrocenium redox couple).

It will be understood that the invention disclosed and defined in this specification extends to all alternative combinations of two or more of the individual features mentioned or evident from the text or drawings. All of these different combinations constitute various alternative aspects of the invention.

The invention claimed is:
1. A method for the electrorecovery of metal from a metal salt, the method including the steps of:
   dissolving the metal salt in an ionic liquid to form a solution of metal ions in the ionic liquid,
   the ionic liquid including an ionic liquid cation and an ionic liquid anion, whereby the metal ions in solution form metal complexes in solution with at least the ionic liquid cation, wherein the ionic liquid cation includes at least one heteroatom having a positive charge and at least one donor centre (D) having a lone pair of electrons with sufficient Lewis basicity for coordination to each metal ion to form a neutral or positive charge on the metal complexes or to reduce a size of a negative charge on the metal complexes as compared to their charge if coordination had occurred by the ionic liquid anion of the ionic liquid alone, wherein an affinity of the ionic liquid cation for the each metal ion is at least about equal to that of an affinity of the ionic liquid anion for each metal ion to be recovered; and
   wherein the ionic liquid cation is such that a complex formation constant between each metal ion to be recovered and the ionic liquid cation allows sufficient bond formation with each metal ion in the dissolution process to form the metal complexes and ease of bond breaking allows metal recovery from the metal complexes at a cathode; and subjecting the metal complexes to an electrical potential between the cathode and an anode to recover metal from the metal complexes at the cathode; and wherein the metal is aluminium.

2. The method of claim 1, wherein the heteroatom is selected from the group consisting of group VA and group VIA elements of the periodic table.

3. The method of claim 1, wherein the donor centre (D) includes an atom selected from the group consisting of the group VA to group VIIA elements of the periodic table.

4. The method of claim 3, wherein the donor centre (D) includes an atom selected from the group consisting of O, N, S and P.

5. The method of claim 3, wherein the donor centre (D) includes an oxygen atom.

6. The method of claim 1, wherein the ionic liquid cation is 1-alkyl-1,4-diazabicyclo[2.2.2]octane ($C_n$DABCO).

7. The method of claim 6, wherein the alkyl group ($C_n$) is $C_1$ to $C_{14}$ moiety that is saturated, unsaturated, branched or contains other functionalities.

8. The method of claim 1, wherein the ionic liquid anion is bis(trifluoromethylsulfonyl)amide.

9. The method of claim 1, wherein the metal complexes further include the ionic liquid anion.

10. The method of claim 1, wherein the metal complexes are not negatively-charged.

11. The method of claim 1, wherein co-ordination by the ionic liquid cation of the ionic liquid to the at least one metal ion forms a neutral or positively-charged metal complex among the metal complexes.

12. The method of claim 1, wherein the donor centres (D) are present in a sufficient number to allow interaction with the at least one metal ion in preference to the ionic liquid anion that would otherwise co-ordinate to the metal ion.

13. A method of accelerating the rate of reduction of a metal complex at a negatively charged cathode during electrorecovery of metal from a metal salt in an ionic liquid, the method comprising:

wherein the metal salt includes at least one metal ion, and the ionic liquid includes an ionic liquid cation and an ionic liquid anion, wherein the ionic liquid anion forms a first negatively charged metal complex with the at least one metal ion, forming a metal complex less negatively charged than the first negatively charged complex by:

adding to the first negatively charged metal complex at least one ionic liquid cation including at least one heteroatom having a positive charge and at least one donor centre (D) having a lone pair of electrons with sufficient Lewis basicity for co-ordination to the at least one metal ion to form the less negatively charged metal complex; or substituting at least one ionic liquid anion of the first negatively charged metal complex with an ionic liquid cation including at least one heteroatom having a positive charge and at least one donor centre (D) having a lone pair of electrons with sufficient Lewis basicity for co-ordination to the at least one metal ion to form the less negatively charged metal complex; and wherein formation of the less negatively charged metal complex assists in the approach of the less negatively charged metal complex to the negatively charged cathode such that current density of the less negatively charged metal complex reaching the cathode per unit area is from 3 to 5 times higher than current densities achievable when non-coordinating cations are used.

14. The method of claim 13, wherein the approach of the less negatively charged metal complex to the negatively charged cathode is assisted by reducing the Coulombic resistance to movement of the less negatively charged metal complex toward the negatively charged cathode.

15. The method of claim 13 wherein the metal is selected from the group consisting of transition metals, group IIIA to VIA metals, alkali earth metals, rare earth metals, and metalloids.

16. A method for the electrorecovery of metal from a metal salt including at least one metal ion, the method including the steps of:

dissolving the metal salt in an ionic liquid, the ionic liquid including an ionic liquid cation and an ionic liquid anion, whereby the anion is selected from:

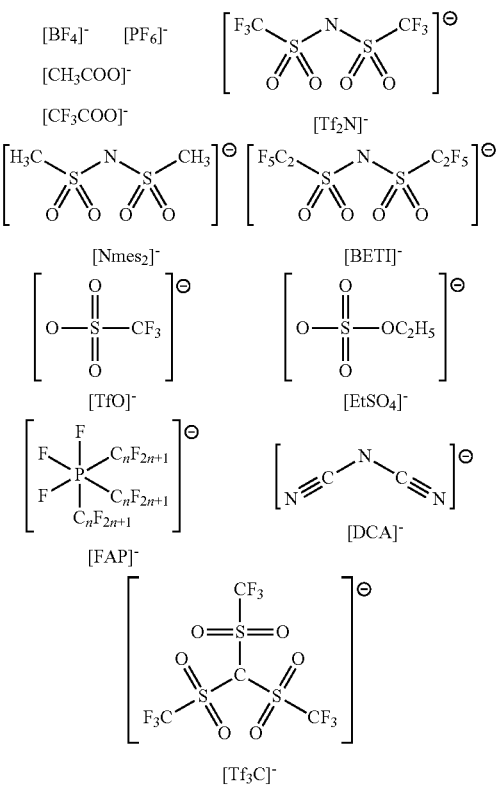

and whereby the metal ion of the metal salt forms a metal complex in solution with at least the ionic liquid cation, wherein the ionic liquid cation includes at least one heteroatom that has a positive charge and at least one donor centre (D) having a lone pair of electrons with sufficient Lewis basicity for co-ordination to the metal ion to form a metal complex less negatively charged than if co-ordination had occurred by the anion of the ionic liquid alone; and subjecting the metal complex to an electrical potential between a cathode and anode to recover metal at the cathode;

wherein the metal is selected from the group consisting of transition metals, group IIIA to VIA metals, alkali earth metal; rare earth metals, and metalloids.

17. The method of claim 16 wherein the metal complex includes only the ionic liquid cation and not the ionic liquid anion.

18. The method of claim 16 wherein the ionic liquid is fluid enough at operating temperatures to allow transport of the complexed metal ions during the electrorecovery process.

19. A method for reducing the bulk concentration of metal ions required in the electrorecovery of metal from a metal salt including at least one metal ion, the method including the steps of:
dissolving the metal salt in an ionic liquid, the ionic liquid including an ionic liquid cation and an ionic liquid anion, whereby the metal ion of the metal salt forms a metal complex in solution with at least the ionic liquid cation, wherein the ionic liquid cation includes at least one heteroatom that has a positive charge and at least one donor centre (D) having a lone pair of electrons with sufficient Lewis basicity for co-ordination to the metal ion to form a metal complex less negatively charged than if co-ordination had occurred by the anion of the ionic liquid alone; and
subjecting the metal complex to an electrical potential between a cathode and anode to recover metal at the cathode;
wherein the metal is selected from the group consisting of transition metals, group IIIA to VIA metals, alkali metals, alkali earth metal, rare earth metals, and metalloids;
wherein the minimum concentration of metal ions in the ionic liquid is reduced to half or less than half of the concentration of metal ions in the ionic liquid for electrodeposition to occur compared to a method using an ionic liquid having non-coordinating cations.

20. The method of claim 19 wherein the rate of the electrorecovery method is accelerated compared to an electrorecovery method using an ionic liquid having non-coordinating cations.

21. The method of claim 19 wherein the metal is selected from the group consisting of transition metals, group IIIA to VIA metals, alkali earth metals, rare earth metals, and metalloids.

22. The method of claim 19 wherein the metal is selected from the group consisting of transition metals, group IIIA to VIA metals, alkali earth metals, rare earth metals, and metalloids.

23. A method for the electrorecovery of metal from a metal salt, the method including the steps of:
dissolving the metal salt in an ionic liquid to form a metal ion in the ionic liquid,
the ionic liquid including an ionic liquid cation and an ionic liquid anion, whereby the metal ion in solution forms a metal complex in solution with at least the ionic liquid cation, wherein the ionic liquid cation includes at least one heteroatom having a positive charge and at least one donor centre (D) having a lone pair of electrons with sufficient Lewis basicity for coordination to the metal ion, and wherein the donor centres (D) are present in a sufficient number and are of sufficient Lewis basicity such that the ionic liquid cation interacts with the metal ion to be recovered in preference to the at least one ionic liquid anion that would otherwise co-ordinate to the metal ion such that interaction of the ionic liquid cation with the metal ion takes place to form a neutral or positive charge on the metal complex or to reduce a size of the negative charge on the metal complex as compared to their charge if coordination had occurred by the ionic liquid anion of the ionic liquid alone; and
wherein the ionic liquid cation is such that a complex formation constant between the metal ion and the ionic liquid cation allows sufficient bond formation with the metal ion in the dissolution process to form the metal complex and ease of bond breaking allows metal recovery from the metal complex at the cathode; and
subjecting the metal complex to an electrical potential between a cathode and anode to recover metal from the metal complex at the cathode; and
wherein the metal is selected from the group consisting of transition metals, group IIIA to VIA metals, alkali metals, alkali earth metals, rare earth metals, and metalloids.

24. The method of claim 23 wherein the rate of the electrorecovery method is accelerated compared to an electrorecovery method using an ionic liquid having non-coordinating cations.

25. The method of claim 23 wherein the metal is selected from the group consisting of transition metals, group IIIA to VIA metals, alkali earth metals, rare earth metals, and metalloids.

* * * * *